(12) United States Patent
Ersan

(10) Patent No.: US 8,348,195 B2
(45) Date of Patent: Jan. 8, 2013

(54) ARRAY OF AIRCRAFT SEATS

(75) Inventor: Ali Ersan, London (GB)

(73) Assignee: American Airlines, Inc., Fort Worth, TX (US)

( * ) Notice: Subject to any disclaimer, the term of this patent is extended or adjusted under 35 U.S.C. 154(b) by 566 days.

(21) Appl. No.: 12/462,904

(22) Filed: Aug. 11, 2009

(65) Prior Publication Data

US 2010/0038484 A1    Feb. 18, 2010

Related U.S. Application Data

(60) Provisional application No. 61/188,960, filed on Aug. 14, 2008.

(51) Int. Cl.
*B64D 11/06* (2006.01)

(52) U.S. Cl. .................. 244/118.6; 244/118.5

(58) Field of Classification Search .......... 244/118.5, 244/118.6, 122 R, 117 R; 297/1, 118, 232, 297/245, 354.13; 5/9.1, 10.1
See application file for complete search history.

(56) References Cited

U.S. PATENT DOCUMENTS

| | | | |
|---|---|---|---|
| 7,025,306 B2 * | 4/2006 | Saint Jalmes | 244/118.6 |
| 7,178,871 B1 * | 2/2007 | Round et al. | 297/244 |
| 7,523,888 B2 * | 4/2009 | Ferry et al. | 244/118.6 |
| 2007/0040434 A1 * | 2/2007 | Plant | 297/354.13 |
| 2008/0088160 A1 * | 4/2008 | Johnson | 297/240 |

FOREIGN PATENT DOCUMENTS

| | | |
|---|---|---|
| DE | 10 2006 056898 | 6/2008 |
| EP | 1 364 874 A1 | 11/2003 |
| WO | WO 00/21831 | 4/2000 |
| WO | WO 03/013903 | 2/2003 |

* cited by examiner

*Primary Examiner* — Tien Dinh
*Assistant Examiner* — Jamie S Stehle
(74) *Attorney, Agent, or Firm* — Bay State IP, LLC

(57) ABSTRACT

The sleeper seats are shown in sleeping mode. Each comprises a head rest, a back rest, a seat pan or seat cushion and a leg rest, all of which move in a conventional manner when the seat is moved from sleeping mode to sitting mode. The seats also include ottomans. Further they have inter-seat dividers between the individual seats within the their column. The six seats are arranged in a chevron formation or array and two columns. All the seats in each column are parallel with each other and have central axes A set at a "herringbone" angle α to the column direction and in particular to a longitudinal axis 10 of the array.

18 Claims, 5 Drawing Sheets

US 8,348,195 B2

ARRAY OF AIRCRAFT SEATS

CROSS REFERENCE TO RELATED APPLICATION

This application takes priority from and claims the benefit of Provisional Application Ser. No. 61/188,960 filed on Aug. 14, 2008 the contents of which are hereby incorporated by reference.

BACKGROUND OF THE INVENTION

1. Field of the Invention

The present invention relates to an array of aircraft seats.

2. Description of the Related Art

Aircraft passenger seats are arrayed in an aircraft cabin in accordance with a Layout of Passenger Accommodation, known in the art as a LOPA. A LOPA generally refers to the layout for an entire aircraft and includes not only seating, but also galleys and lavatories. The present invention relates to an array primarily, but not exclusively, for sleeper seats; that is seats that are convertible from sitting mode to sleeping mode. Such seats usually comprise a proportion only of the total seating in a cabin. Accordingly in this specification, the term "array of aircraft seats" of aircraft seats is used to denote arrangement of a proportion, or indeed possibly the totality, of the seats in an overall LOPA.

In design of a LOPA, a major consideration is efficient utilisation of the cabin that is maximising the number of seats or at least maximising revenue from the seats, bearing in mind that sleeper seats command a substantial premium with respect to economy seats.

SUMMARY OF THE INVENTION

The object of the present invention is to provide an improved array of aircraft seats.

According to the invention there is provided an array of aircraft sleeper seats, the seats being convertible between a sitting mode and a sleeping mode, the array of seats comprising:

two columns of seats arranged for array along an aircraft cabin on respective sides of a longitudinal axis of the array;

the seats having respective central axes, the seats in both columns having their central axes angled with respect to the longitudinal axis and the array including at least one quartet of the seats, the quartet of seats in sleeping mode having:

two seats from one column on one side of the longitudinal axis, the two seats at least partially overlapping along the longitudinal axis of the array, with one of these two seats facing inwards towards the longitudinal axis and the other of these two seats facing outwards from the longitudinal axis and two seats from the other column on the other side of the longitudinal axis, the two seats at least partially overlapping along the longitudinal axis of the array, with one of these two seats facing inwards towards the longitudinal axis and the other of these two seats facing outwards from the longitudinal axis.

Preferably the seats in the or each quartet of seats are arranged in pairs of adjacent seats, each pair of adjacent seats having one seat from one column on one side of the longitudinal axis and the other seat from the other column on the other side of the longitudinal axis, the pairs of seats facing in opposite directions along the longitudinal axis:

the seats of one pair facing inwards towards the longitudinal axis and the seats of the next pair along the longitudinal axis facing outwards from the longitudinal axis.

Whilst it can be envisaged that the seats in the two columns may all be set parallel with each other, in the preferred embodiment, the seats are set in a chevron array.

In the case of a chevron array, the angle of the seats, i.e. the angle between the longitudinal axis and the central axes of the seats is referred to as the "herringbone" angle of the array. The direction across the seats, as at the junction of a back rest and a seat cushion or seat pan, is referred to as a "complementary herringbone" angle, i.e. the third angle of a right angle triangle having the herringbone angle as the second angle.

Again, it can be envisaged that the seats are staggered, whereby corresponding seats in one column are longitudinally displaced with respect to each other. However it is preferred that they are arrayed to have equidistant longitudinal positions in the two columns.

Preferably, the pairs of seats are separated—in sleeping mode—only by a longitudinal divider along the longitudinal axis. In the preferred embodiment, the inwards facing pairs of seats have respective ottomans on either side of the divider, the ottomans being triangular, one side extending along the divider, a second side extending at substantially the complementary herringbone angle across the end of a leg rest of the seat in sleeping mode and the third side extending away from the divider. The inner corner of the leg rests substantially abut the longitudinal divider. Similarly the inner corner of the head rests (in sleeping mode) of the outwards facing seats substantially abuts the longitudinal divider.

Additionally to the longitudinal divider, the individual seats in the columns have inter-seat dividers between them. Whilst these can deviate from being at right angles from the longitudinal divider, where they meet the latter, particularly towards the complementary herringbone angle where they cross behind head rests at the longitudinal divider and away from the complementary angle where they cross in behind a ottoman at the longitudinal divider (in both cases behind being used in the context of relative position from the perspective of a user of the seat); preferably the inter-seat dividers extend substantially at right angles to the longitudinal divider.

At aisles opposite the seats from the longitudinal divider, the inter-seat dividers can end or be continued along the aisle. Where they cross behind head rests of inwards facing seats, they can be angled towards the complementary herringbone angle, but are preferably substantially at right angles to the longitudinal divider. Further, at the aisle, they preferably continue along the aisle. Where the inter-seat dividers extend behind ottomans, they are preferably angled away from the complementary angle. Such angling allows the ottoman to be of appreciable size, without impinging on the access space.

Preferably, the array includes on opposite sides of the aisles, two side columns of angled, alternate-facing seats set against cabin side walls, one side column on one side of the two columns along the longitudinal axis and the other on the other side. Preferably the seats and inter-seat dividers are arranged in the side columns in like manner to the seats and inter-seat dividers in the central columns. Whilst the seats on opposite sides of the aisles can be parallel to each other, they are preferably in chevron array, albeit a staggered chevron.

BRIEF DESCRIPTION OF THE DRAWINGS

To help understanding of the invention, a specific embodiment thereof will now be described by way of example and with reference to the accompanying drawings, in which.

DETAILED DESCRIPTION OF THE PREFERRED EMBODIMENT

Figure 1:
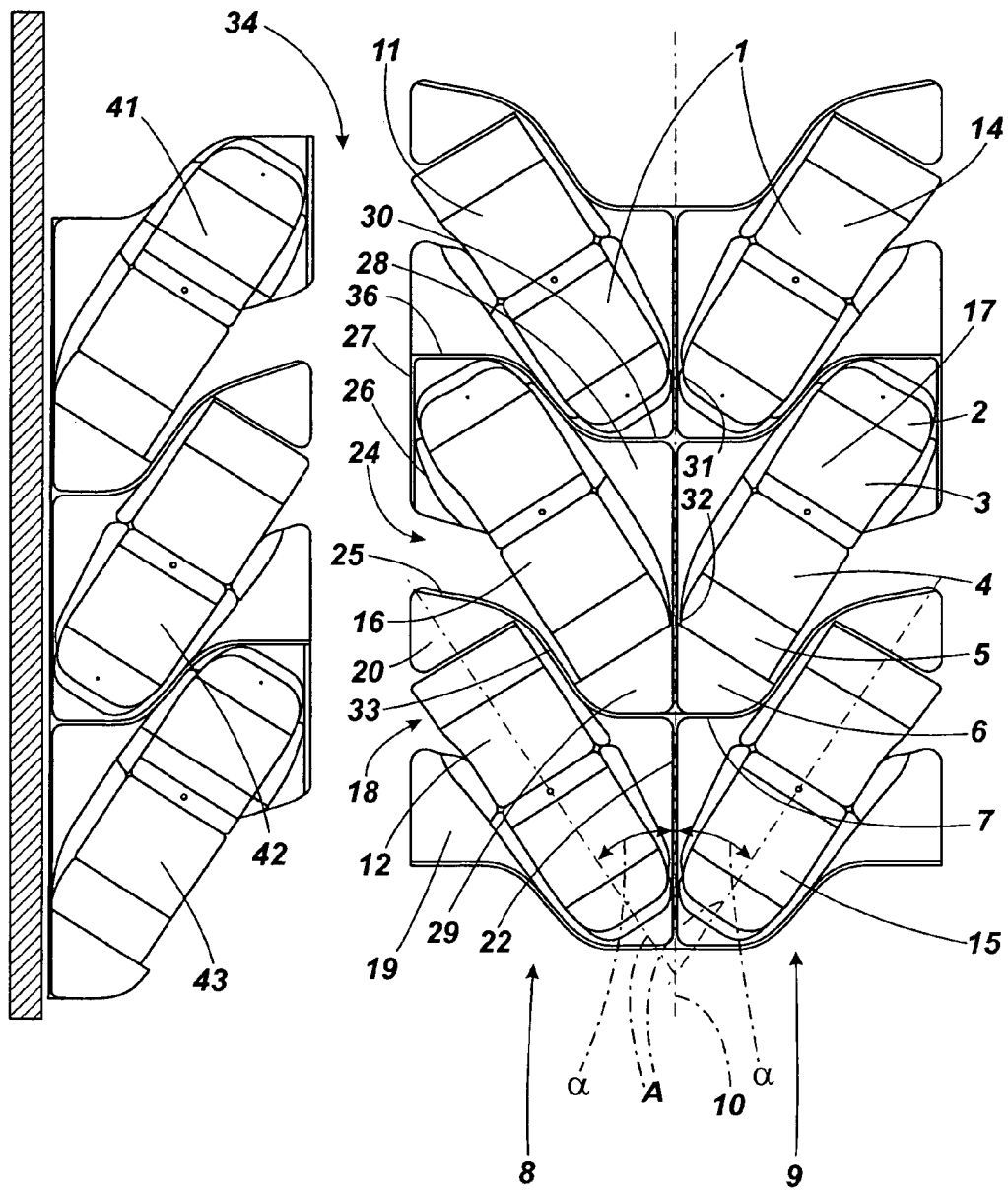
FIG. 1 is a plan view of a short array of six sleeper seats arrayed in accordance with the invention.
Figure 2:
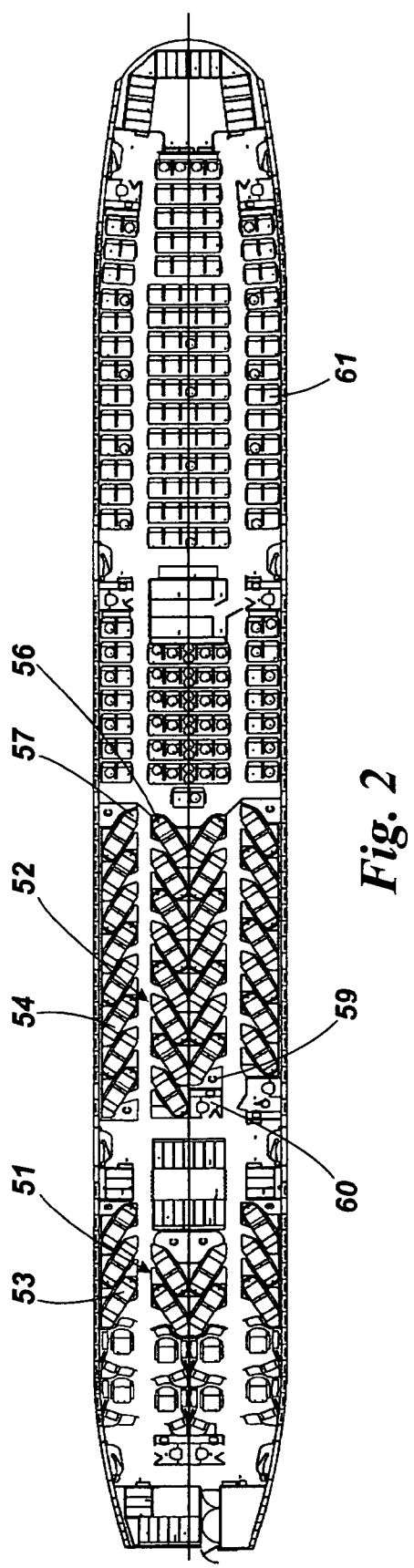
FIG. 2 is a LOPA view of the seats of FIG. 1 in an aircraft cabin.

Referring to FIGS. 1 & 2, the sleeper seats 1 are shown there in sleeping mode. Each comprises a head rest 2, a back rest 3, a seat pan or seat cushion 4 and a leg rest 5, all of which move in a conventional manner when the seat is moved from sleeping mode to sitting mode. The seats also include ottomans 6. Further they have inter-seat dividers 7 between the individual seats within the their column. The six seats shown in FIG. 1—at the right of the Figure—are arranged in a chevron formation or array and two columns 8, 9. All the seats in each column are parallel with each other and have central axes A set at a "herringbone" angle α to the column direction and in particular to a longitudinal axis 10 of the array. This angle is measured anti-clockwise from the longitudinal axis for the seats in column 8 and clockwise for the seats in column 9.

However, whilst being angled at the same herringbone angle, alternate seats face in alternate directions. Thus seats 11, 12, 14, 15 face outwards, whilst intervening seats 16, 17 face inwards. Please note the terms "outwards" and "inwards" are used in respect of the direction out from and in towards the longitudinal axis A, which will generally be along the centre of the aircraft cabin in which the seats will be arrayed when installed.

It should be noted that seats 11,14,16,17 are arrayed as a quartet of the seats having:
two seats 11,16 from one column 8 on one side of the longitudinal axis 10, with
one 16 of these two seats facing inwards towards the longitudinal axis and
the other 11 of these two seats facing outwards from the longitudinal axis and
two seats 14,17 from the other column 9 on the other side of the longitudinal axis 10, with
one 17 of these two seats facing inwards towards the longitudinal axis and
the other 14 of these two seats facing outwards from the longitudinal axis.
The seats 16,17,12,15 are similarly arrayed.

Whilst it can be appreciated that when the seats are moved from sleeping mode as shown to sitting mode, access to the outwards facing seats is readily available via their passage spaces 18 between their side furniture 19 and their triangular ottomans 20. Inter-seat dividers 7 give the individual seats privacy. At the head end of each of these seats, a longitudinal divider 22 on the longitudinal axis 10 extends between the inter-seat dividers and indeed along the axis. The inter-seat dividers extend away from the longitudinal dividers at right angles.

The inwards facing seats have an access passage 24, between the foot end 25 of a divider from an adjacent seat and side furniture 26 of the seat in question. An extension 27 of this seat's divider extends around an aisle side of the seat head rest. Opposite the seat, against the longitudinal divider is a side furniture shelf 28. At the foot of the bed is its ottoman 29. This is triangular, with one side against the longitudinal divider, one against the inter-seat divider 30 and a third at the complementary herringbone angle (defined above). The herringbone angle α of the array in FIG. 1 is 33°.

It should be noted that the seats on either side of the longitudinal divider come close to each other—being in effect separated by it only at the inboard corners 31 of the head rests of the outwards facing seats and the inboard corners 32 of the leg rests of the inwards facing seats, these corners being slightly rounded. Also at intermediate portions 33 of the inter-seat dividers, these extend at the herringbone angle, before turning more directly towards the aisles 34. Those inter-seat divider portions 25 passing along the ottomans 20 of the outwards facing seats do not turn fully perpendicular again to the longitudinal dividers, so as not to restrict the size of these ottomans, whilst portions 36 at the head rest ends of the inwards facing seats do turn perpendicular to meet their extensions 27.

On the other side of the aisles 33 are a single column of seats 41, 42, 43, also in herringbone, alternately facing array. These seats are to all intents and purposes the same as the seats of the two central columns, save only that their herringbone angle is very slightly different at 32°. It should be noted that they are in chevron array with respect to the central seats also fronting the aisle.

Turning to FIG. 2, there is shown two arrays 51, 52 in accordance with the invention in a three class/fare aircraft cabin. Corresponding cabin wall seats 53, 54 are provided. It will be noted that:
the chevrons of the arrays 51,52 point forwards in the cabin;
there are different numbers of seats in the array 51 from the side wall seats 53, at least as regards those fronting the same aisle;
the array 52 has one seat missing and its place taken by a lavatory 58 and a cupboard 59.

Figure 3:
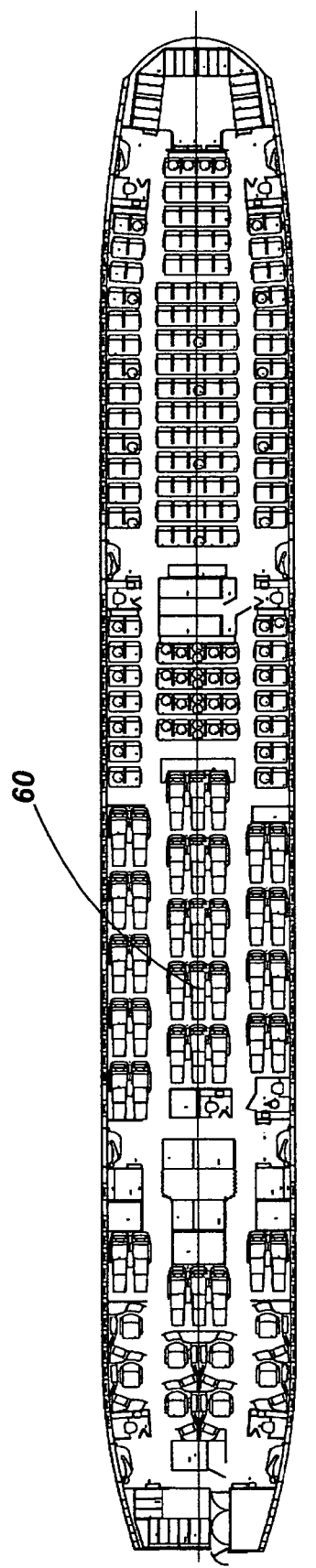
FIG. 3 is an equivalent LOPA to that of FIG. 2 showing a cabin equipped with conventional seats.

It can be noted that the array of FIG. 1 has advantages, which can be appreciated from FIG. 2 by comparison with FIG. 3. The latter shows an equivalent business class passenger count LOPA using conventional business class seats 22, in which LOPA it is necessary for the business class seats to be arrayed three abreast along the centre of the cabin. This requires central passengers to step over their neighbours for aisle access, as is required for window seat passengers seated against the side wall of the cabin. By contrast, the seats arrayed in accordance with the invention all have direct aisle access. Further, it will be noted that the array in accordance with the invention allows an increase by twelve in the number of economy class seats 23.

Figure 4:
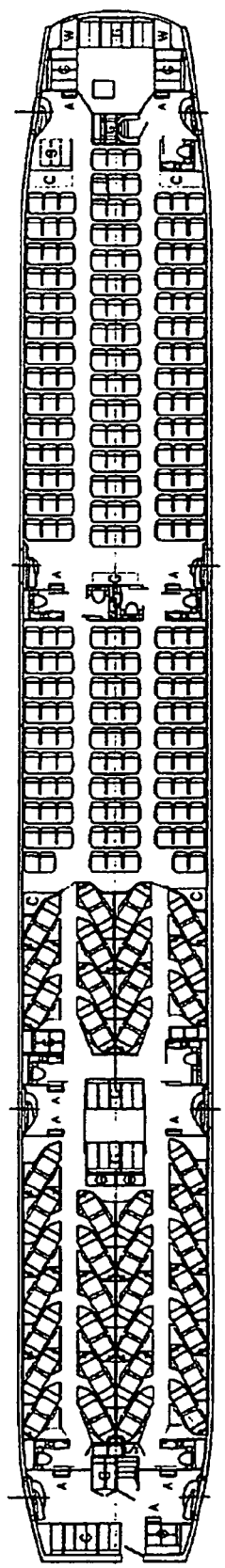
FIG. 4 is a LOPA view of the seats of FIG. 1 in another aircraft cabin.
Figure 5:
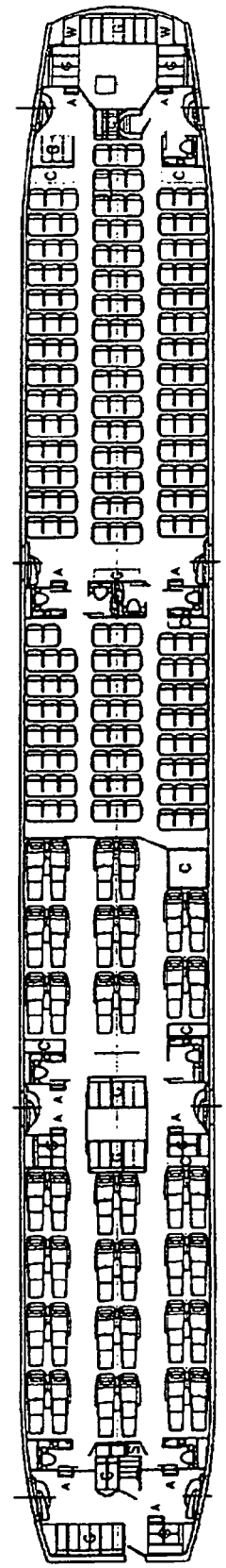
FIG. 5 is an equivalent LOPA to that of FIG. 4 showing a cabin equipped with conventional seats.

Turning on to FIGS. 4 & 5, two similar cabins of a two class/fare aircraft are shown. Again, the array of the invention shows advantages in providing for the same number of business class passengers, but an additional seventeen economy class passengers.

Figure 6:
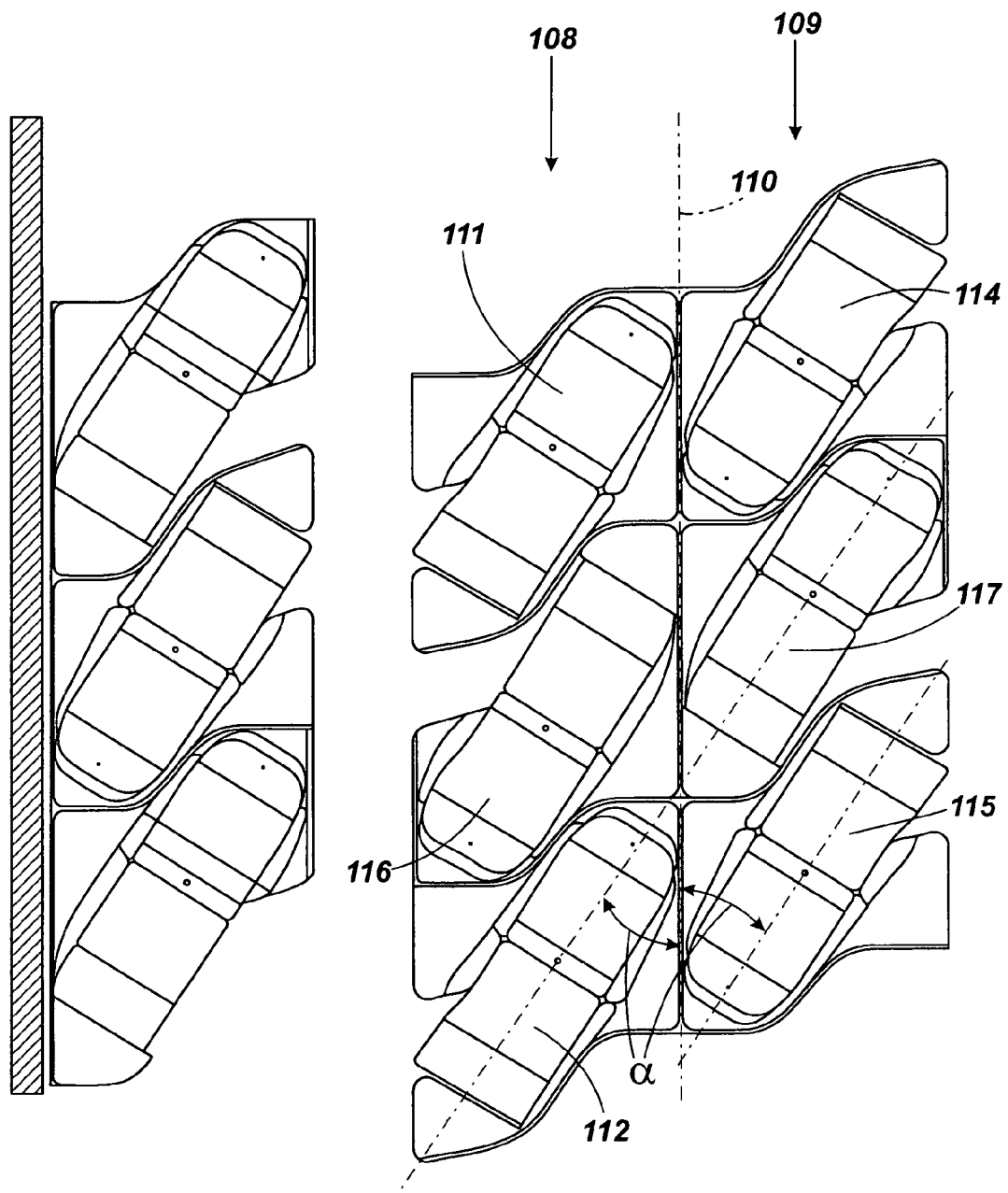
FIG. 6 is a view similar to FIG. 1 of an alternative array in accordance with the invention.

Turning on to FIG. 6, an alternative array of the seats in accordance with the invention is shown. It is substantially identical to the array of FIG. 1, except that the seats of column 108 are a mirror image of the seats of column 8. Thus all the seats have their axes A parallel to each other and set at the same angle α with respect to the longitudinal axis and measured in the same, i.e. clockwise, direction for all the seats in both columns. Further the seats are arranged in pairs facing either inwards or outwards. Thus pairs of seats 111, 112 & 114, 115 face outwards, whilst intervening seats 116,117 face inwards. And again, the seats 111,114,116,117 are arrayed as a quartet of the seats having:

two seats 111,116 from one column 108 on one side of the longitudinal axis 110, with
        one 116 of these two seats facing inwards towards the longitudinal axis and
        the other 111 of these two seats facing outwards from the longitudinal axis and
    two seats 114,117 from the other column 109 on the other side of the longitudinal axis 10, with
        one 117 of these two seats facing inwards towards the longitudinal axis and the other 114 of these two seats facing outwards from the longitudinal axis.

Figure 7:
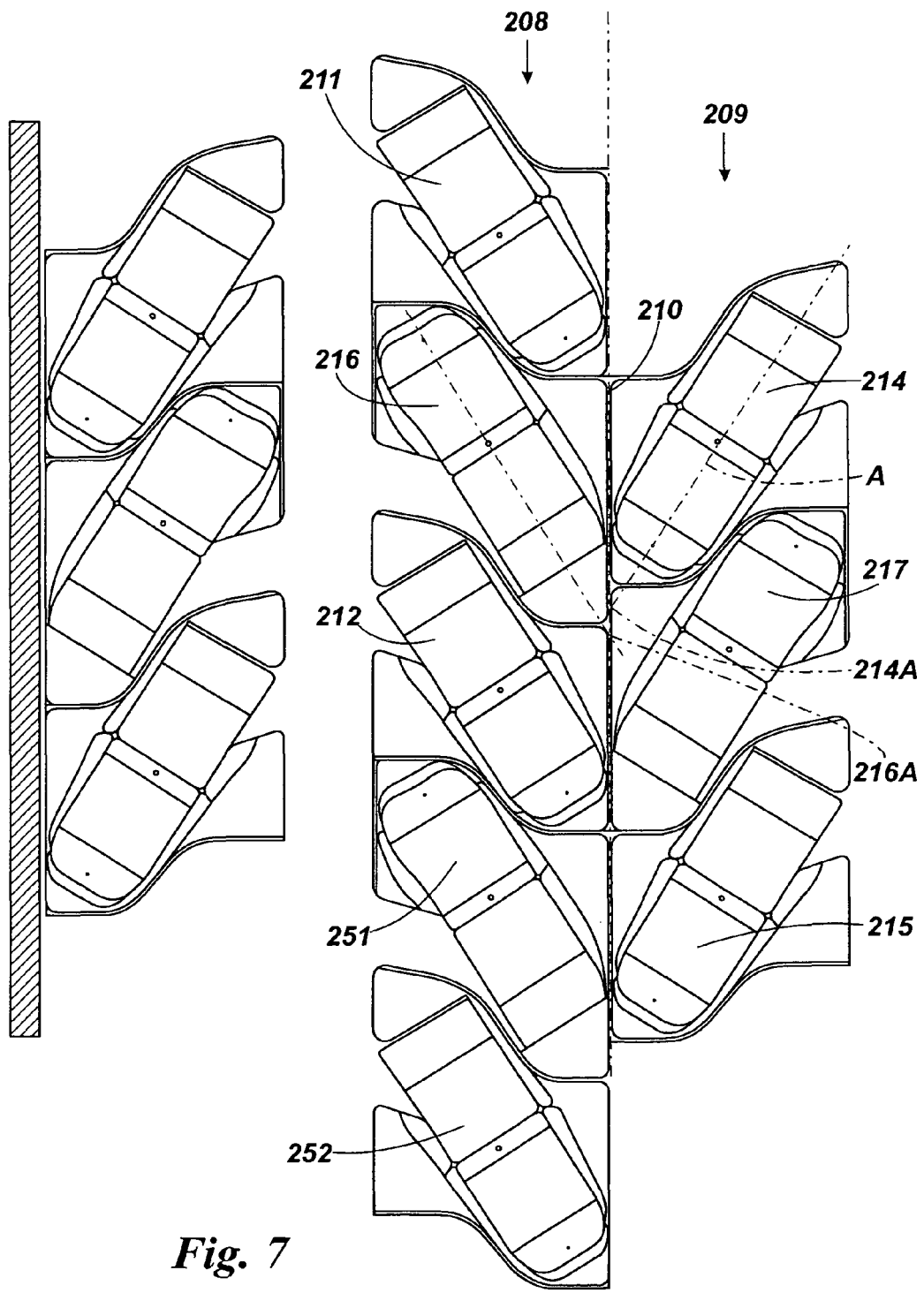
FIG. 7 is a further view similar to FIG. 1 of another alternative array in accordance with the invention.

Turning on again to FIG. 7, another alternative array of the seats in accordance with the invention is shown. Five seats 211,216,212,251,252 are shown in column 208 and three seats 214,217,215 are shown in column 209. The array is substantially identical to the array of FIG. 1, except that the seats of column 208 are translated with respect to the seats of column 8. Thus all the seats alternate in their columns as to the direction in which they face and they are in a staggered chevron array. If the extent of translation were less, they would be are arranged in pairs facing either inwards or outwards. However as shown in FIG. 7 outwards facing seat 211 is no longer paired with outwards facing seat 214. Rather, inwards facing seat 216 is paired with outwards facing seat 214; and so on along the array. However, again, the seats 216,212,214,217 are arrayed as a quartet of the seats having:

two seats 216,212 from one column 208 on one side of the longitudinal axis 210, with
        one 216 of these two seats facing inwards towards the longitudinal axis and
        the other 212 of these two seats facing outwards from the longitudinal axis and
    two seats 214,217 from the other column 209 on the other side of the longitudinal axis 210, with
        one 217 of these two seats facing inwards towards the longitudinal axis and
        the other 214 of these two seats facing outwards from the longitudinal axis.

It will be noted that the central axes A of the seats 214,216 intersect the longitudinal axis 210 at different points 214A, 216A.

I claim:

1. An array of aircraft sleeper seats, the seats being convertible between a sitting mode and a sleeping mode, the array of seats comprising:
    seats arranged for array in two columns along and in rows across an aircraft cabin, the columns being on respective sides of a longitudinal axis of the array;
    the seats having:
        respective central axes,
        as moveable parts, a head rest, a back rest, a seat cushion or pan and a leg rest; and
        an ottoman,
    the seats in both columns having their central axes angled with respect, to the longitudinal axis, and wherein the array including:
    at least one set of six of the seats having:
        three seats from one column on one side of the longitudinal axis, with
            a middle one of these three seats facing along the middle seat's angled central axis in one of:
                a direction in the one column inwards towards the longitudinal axis and
                a direction in the one column outwards therefrom and
            the others of these three seats facing along their angled central axes in the other of the said directions in the one column,
        the middle one of these three one-column seats, including the middle seat's ottoman, when in sleeping mode at least partially overlapping along the longitudinal axis of the array:
            at least at the middle seat's ottoman with at least the ottoman of one of the other two seats and
            at least at the middle seat's head rest with at least the head rest of the other of the other two seats, and
        three seats from the other column on the other side of the longitudinal axis, with
            a middle one of these three seats facing along the middle seat's angled central axis in one of:
                a direction in the other column inwards towards the longitudinal axis and
                a direction in the other column outwards therefrom and
            the others of these three seats facing along their angled central axes in the other of the said directions in the other column,
        the middle one of these three other-column seats, including the middle seat's ottoman, when in sleeping mode at least partially overlapping along the longitudinal axis of the array at least:
            at the middle seat's ottoman with at least the ottoman of one of the other two seats and
            at least at the middle seat's head rest with at least the head rest of the other of the other two seats.

2. An array of aircraft seats according to claim 1, wherein the seats in the at least one set of six seats are arranged in pairs of adjacent seats,
    each pair of adjacent seats having one seat from one column on one side of the longitudinal axis and the other seat from the other column on the other side of the longitudinal axis,
    the pairs of seats facing in opposite directions along the longitudinal axis.

3. An array of aircraft seats according to claim 2, wherein the seats are staggered along the longitudinal axis, whereby the seats in the pairs are displaced along the longitudinal axis with respect to each other with their central axes intersecting the longitudinal axis at different positions.

4. An array of aircraft seats according to claim 2, wherein the seats are equivalently positioned along the longitudinal axis, whereby the central axes of the seats in a plurality of pairs of seats intersects the longitudinal axis at substantially the same positions.

5. An array of aircraft seats according to claim 2, wherein the seats, in the plurality of pairs, are separated by a longitudinal divider along the longitudinal axis.

6. An array of aircraft seats according to claim 5, comprising inter-seat dividers between the individual seats within each column.

7. An array of aircraft seats according to claim 6, wherein at the longitudinal divider, the inter-seat dividers have inner portions extending substantially at right angles to the longitudinal divider.

8. An array of aircraft seats according to claim 7, wherein the inter-seat dividers have intermediate portions extending substantially parallel to the central axes of the two seats which they divide.

9. An array of aircraft seats according to claim 8, wherein the inter-seat dividers have outer portions, either extending substantially at right angles to the longitudinal divider, where the respective outer portion extends behind a head rest end of a seat, or extending at an angle intermediate right angles to the longitudinal divider and the central axis of the seat, where the respective outer portion extends behind an ottoman end of a seat.

10. An array of aircraft seats according to claim 8, wherein the inter-seat dividers have aisle extensions at least from their outer portions extending behind a head rest end of a seat, to at least partially enclose the head rest end.

11. An array of aircraft seats according to claim 2, the array having three pairs of seats facing in opposite directions along the longitudinal axis, with
 a middle one of these three pairs facing in one of:
  a direction inwards towards the longitudinal axis;
  a direction outwards from the longitudinal axis; and
  the others of these three pairs of seats facing in the other of the said directions.

12. An array of aircraft seats according to claim 11, wherein
 the seats of the plurality of pairs facing inwards towards the longitudinal axis have respective ottomans on respective sides of the longitudinal divider; and
 each ottoman being triangular,
  one side of the ottoman extending along the longitudinal divider;
  a second side of the ottoman extending transversely off the central axis of the respective seat across an end of a leg rest of the seat in sleeping mode; and
  a third side of the ottoman extending away from the longitudinal divider.

13. An array of aircraft seats according to claim 12, wherein an inner corner of the leg rest of each inwards facing seat in sleeping mode substantially abuts the longitudinal divider.

14. An array of aircraft seats according to claim 12, wherein an inner corner of a head rest of each outwards facing seat in sleeping mode substantially abuts the longitudinal divider.

15. An array of aircraft seats according to claim 1, wherein all the seats are arranged with their central axes at substantially the same angle with respect to the longitudinal axis.

16. An array of aircraft seats according to claim 15, wherein the seats in one column are arranged substantially parallel with the seats in the other column, that is with the central axes of all the seats in both columns making with the longitudinal axis substantially the same angle measured in the clockwise or anti-clockwise direction.

17. An array of aircraft seats according to claim 15, wherein the seats are arranged in a chevron array, that is with the seats in one column angled with respect to the seats in the other column, and with the central axes of all the seats in one column making with the longitudinal axis substantially the same angle measured in the clockwise or anti-clockwise direction as the central axes of all the seats in the other column make with the longitudinal axis measured in the anti-clockwise or clockwise direction.

18. An array of aircraft seats according to claim 1, comprising at least one further column of seats spaced by an aisle from the neighbouring one of the two columns of seats:
 the seats of the further column having respective central axes;
 the seats in the further column having their central axes angled with respect to the longitudinal axis; and
 the seats in the further column facing in opposite directions along the longitudinal axis, one facing towards the longitudinal axis and the next facing away from the longitudinal axis.

* * * * *